(12) United States Patent
Shu et al.

(10) Patent No.: US 10,954,445 B2
(45) Date of Patent: Mar. 23, 2021

(54) LIQUID CRYSTAL COMPOSITION

(71) Applicant: Shijiazhuang Chengzhi Yonghua Display Material Co., Ltd, Shijiazhuang (CN)

(72) Inventors: Ke-Lun Shu, Shijiazhuang (CN); RuiXiang Liang, Shijiazhuang (CN); YanLi Dong, Shijiazhuang (CN); YunXia Qiao, Shijiazhuang (CN); Lei Zhao, Shijiazhuang (CN); HuBo Zhang, Shijiazhuang (CN)

(73) Assignee: SHIJIAZHUANG CHENGZHI YONGHUA DISPLAY MATERIAL CO., LTD., Shijiazhuang (CN)

( * ) Notice: Subject to any disclaimer, the term of this patent is extended or adjusted under 35 U.S.C. 154(b) by 6 days.

(21) Appl. No.: 16/139,431

(22) Filed: Sep. 24, 2018

(65) Prior Publication Data
US 2019/0100697 A1 Apr. 4, 2019

(30) Foreign Application Priority Data

Sep. 30, 2017 (CN) .......................... 201710917295.2

(51) Int. Cl.
| | |
|---|---|
| *G02F 1/1333* | (2006.01) |
| *C09K 19/44* | (2006.01) |
| *C09K 19/30* | (2006.01) |
| *C09K 19/34* | (2006.01) |
| *C09K 19/12* | (2006.01) |
| *C09K 19/18* | (2006.01) |
| *C09K 19/04* | (2006.01) |

(52) U.S. Cl.
CPC .............. *C09K 19/44* (2013.01); *C09K 19/12* (2013.01); *C09K 19/18* (2013.01); *C09K 19/3003* (2013.01); *C09K 19/3028* (2013.01); *C09K 19/3059* (2013.01); *C09K 19/3066* (2013.01); *C09K 19/3402* (2013.01); *C09K 2019/0466* (2013.01); *C09K 2019/122* (2013.01); *C09K 2019/123* (2013.01); *C09K 2019/181* (2013.01); *C09K 2019/301* (2013.01); *C09K 2019/3004* (2013.01); *C09K 2019/3009* (2013.01); *C09K 2019/3016* (2013.01); *C09K 2019/3019* (2013.01); *C09K 2019/3021* (2013.01); *C09K 2019/3025* (2013.01); *C09K 2019/3036* (2013.01); *C09K 2019/3063* (2013.01); *C09K 2019/3422* (2013.01); *C09K 2019/3425* (2013.01)

(58) Field of Classification Search
CPC ........ C09K 19/44; C09K 19/12; C09K 19/18; C09K 19/3003; C09K 19/3028; C09K 19/3059; C09K 19/3066; C09K 19/3402; C09K 2019/0466; C09K 2019/122; C09K 2019/123; C09K 2019/181; C09K 2019/3004; C09K 2019/3009; C09K 2019/301; C09K 2019/3016; C09K 2019/3019; C09K 2019/3021; C09K 2019/3025; C09K 2019/3036; C09K 2019/3063; C09K 2019/3422; C09K 2019/3425; G02F 1/1333
USPC ..................................................... 252/299.62
See application file for complete search history.

(56) References Cited

U.S. PATENT DOCUMENTS

| | | | |
|---|---|---|---|
| 9,441,162 B2 * | 9/2016 | Furusato ............ | C09K 19/3483 |
| 2017/0253800 A1 * | 9/2017 | Maruyama ......... | C09K 19/3003 |

* cited by examiner

*Primary Examiner* — Geraldina Visconti
(74) *Attorney, Agent, or Firm* — Muncy, Geissler, Olds & Lowe, PC

(57) ABSTRACT

Disclosed is a liquid crystal composition comprising one or more compounds represented by formula I and/or formula II and one or more compounds represented by formula III:

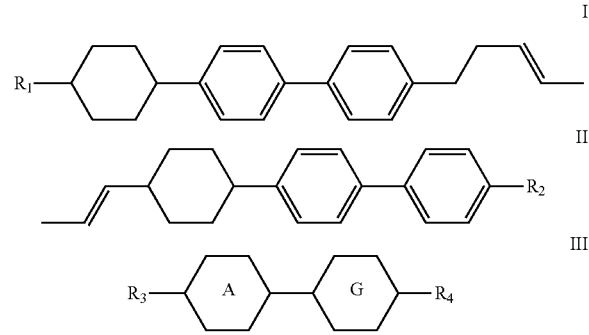

wherein the definition of each substituent is given. The composition involved in the present invention has a low viscosity $\gamma_1$, a high clearing point Tni and a large optical anisotropy $\Delta n$, and can realize a rapid response of liquid crystal display.

10 Claims, No Drawings

LIQUID CRYSTAL COMPOSITION

TECHNICAL FIELD

The present invention relates to the liquid crystal display field, and in particular relates to a liquid crystal composition and a liquid crystal display element or liquid crystal display comprising the liquid crystal composition.

BACKGROUND ART

At present, the expansion of application range of liquid crystal compounds becomes larger and larger, and the liquid crystal compounds can be used in various types of displays, electro-optical devices, sensors and the like. The liquid crystal compounds for use in the above-mentioned display field are in a wide range of varieties, wherein the application in nematic phase liquid crystals is most extensive. Nematic phase liquid crystals have been used in passive TN and STN matrix displays and systems having a TFT active matrix.

Display is a process of converting an electrical signal (data information) into visible light (visual information), and a device for realizing display is namely a Man-Machine Interface (MMI). Flat panel displays (FPD) are currently the most popular class of display devices. Liquid crystal display (LCD) is the first to be developed among FPDs, and is a commercialized product. At present, thin film transistor liquid crystal displays (TFT-LCD) have become a mainstream product in LCD applications. Liquid crystal materials, as one of the important optoelectronic materials for liquid crystal displays, play an important role in improving the performance of a liquid crystal display.

As liquid crystal materials, they need to have good chemical and thermal stability and stability to electric fields and electromagnetic radiations. Furthermore, as liquid crystal materials for thin film transistor techniques (TFT-LCD), they not only need to have the stabilities as above, but also should have a broader nematic phase temperature range, a suitable birefringence anisotropy, a very high electrical resistivity, a good anti-ultraviolet property, a high charge retention ratio, a low vapor pressure and other properties.

As for the application of dynamic picture displays, elimination of ghosting and trailing of display pictures, the liquid crystal is required to have a very fast response speed, and therefore the liquid crystal is required to have a lower rotary viscosity $\gamma_1$; in addition, for portable devices, the driving voltage of liquid crystal is desired to be as low as possible, in order to reduce the equipment energy consumption, and for displays for use in televisions, the requirements of drive voltage of the liquid crystals are not as low as that.

The viscosity, in particular rotary viscosity $\gamma_1$, of a liquid crystal compound directly affects the response time after the liquid crystal is energized, and both the rise time ($t_{on}$) and fall time ($t_{off}$) are proportional to the rotary viscosity $\gamma_1$ of the liquid crystal; moreover, since the rise time ($t_{on}$) is related to a liquid crystal cell and the drive voltage, it can be adjusted by means of increasing the drive voltage and reducing the thickness of the liquid crystal cell; while the fall time ($t_{off}$) is irrelevant to the drive voltage, but is mainly related to the elastic constant of the liquid crystal and the thickness of the liquid crystal cell, and a decrease in cell thickness can result in a decrease in fall time ($t_{off}$); moreover, in different display modes, the movement manners of liquid crystal molecules are different, and the three modes TN, IPS and VA are inversely proportional to the mean elastic constant K, twist elastic constant and bend elastic constant, respectively.

According to the theory of liquid crystal continuum, after being deformed under the action of an external force (an electric field or a magnetic field), various different liquid crystals can "rebound" back to the original shapes by means of intermolecular interactions; likewise, liquid crystals also form a "viscosity" due to the intermolecular forces. Small changes of liquid crystal molecules may result in obvious changes in the conventional parameter performance of the liquid crystal, wherein for some of these changes, there is a certain rule, while for some changes, it is difficult to find a rule, which may also have obvious effects on the intermolecular interaction of the liquid crystal, these effects are very subtle, and to date, no perfect theoretical explanation has been formed yet.

The viscosity of a liquid crystal is related to the molecular structure of the liquid crystal, and studying the relationship between the viscosity of a liquid crystal system formed from different liquid crystal molecules and the molecular structures of the liquid crystals is one of important tasks of liquid crystal formulation engineers.

SUMMARY OF THE INVENTION

An object of the present invention is to provide a liquid crystal composition and a liquid crystal display element or liquid crystal display comprising the liquid crystal composition, wherein the liquid crystal composition has a low viscosity and a larger optical anisotropy Δn, and can achieve a fast response. The liquid crystal display element or liquid crystal display comprising the liquid crystal composition has a broader nematic phase temperature range, a suitable birefringence anisotropy, a very high electrical resistivity, a good anti-ultraviolet property, a high charge holding ratio, a low vapour pressure, etc.

In order to achieve the above-mentioned beneficial technical effects, the present invention provides a liquid crystal composition comprising one or more compounds represented by formula I and/or formula II and one or more compounds represented by formula III:

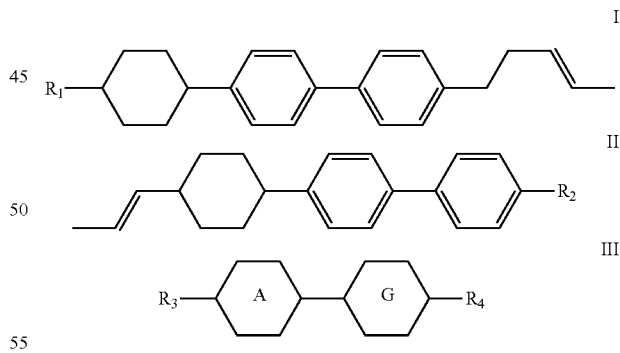

wherein
$R_1$, $R_2$ and $R_4$ each independently represent an alkyl group having a carbon atom number of 1-5 or an alkenyl group having a carbon atom number of 2-5;
$R_3$ represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8;

wherein any one or more non-connected $CH_2$ in groups represented by $R_1$, $R_2$, $R_3$ and $R_4$ may be substituted with cyclopentyl, cyclobutyl, cyclopropyl or —O—; and

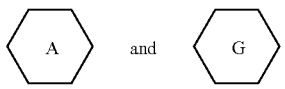

each independently represent 1,4-phenylene, 1,4-cyclohexylene or 1,4-cyclohexenylene.

The liquid crystal composition of the present invention preferably does not comprise a liquid crystal compound containing —CN, and does not comprise any compound containing a pyridine or pyrimidine ring.

Further preferably, the present invention does not contain any liquid crystal compound with a fused ring structure.

The liquid crystal composition provided by the present invention has $\Delta n$ [589 nm, 25° C.]>0.08, $\Delta\varepsilon$[1 KHz, 25° C.]>2 or $\Delta\varepsilon$ [1 KHz, 25° C.]<–2, a clearing point Cp>70.0° C., and a rotatory viscosity $\gamma_1$ [25° C.] between 40 mPa·s and 120 mPa·s.

In the liquid crystal composition provided by the present invention, the total mass content of said one or more compounds represented by formula I and/or II is preferably 1-20%, the total mass content of said one or more compounds represented by formula III is preferably 5-85%, and the total mass content of said one or more compounds represented by formula III-B is preferably 5-55%.

The liquid crystal composition of the present invention does not contain any liquid crystal component with a —CN structure, nor any compound containing a pyridine or pyrimidine ring. —CN has a large permanent dipole moment and a relatively abundant electron cloud, and is easy to adsorb cations, thereby causing ionic solvation, reducing the electrical properties, such as the charge holding ratio VHR, electrical resistivity p and power consumption, of the liquid crystal. The quality of a pyridine or pyrimidine ring compound tends to degrade due to the fact that electrons are easily excited under UV.

Depending on various substituents, the compound represented by formula I is specifically a compound represented by formula I1-I4, and the compound represented by formula II is specifically a compound represented by formula II1-II5:

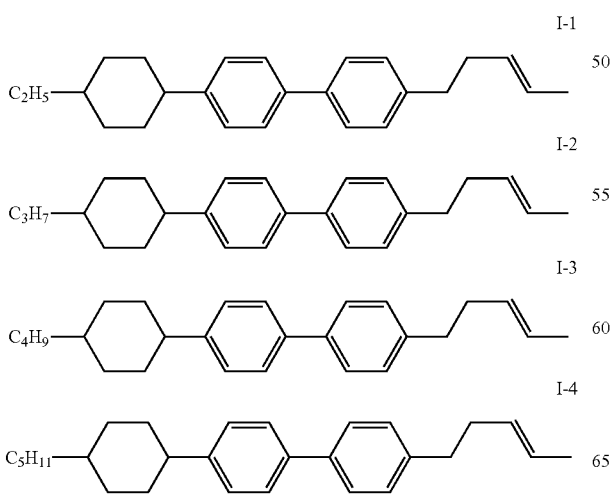

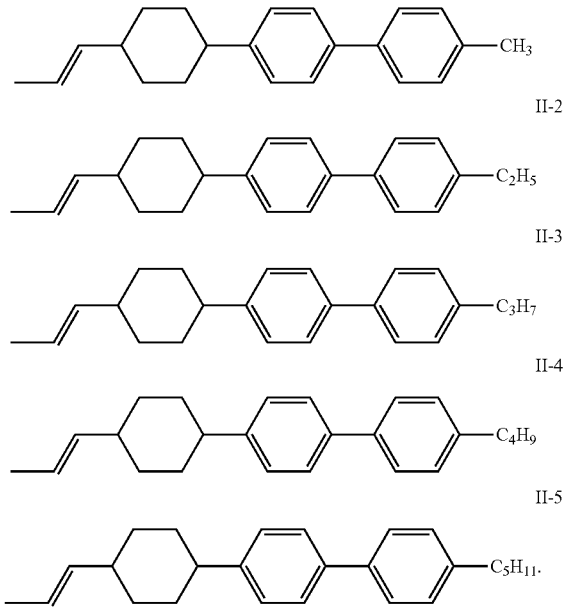

The compounds represented by formulas I1 and II1 generally have a good miscibility with other liquid crystals, and the optical anisotropies $\Delta n$ of the compounds are generally large and are generally larger than the $\Delta n$ of a mixed liquid crystal; therefore, the compounds may be used for the development of low-cell thickness liquid crystals. Where $R_2$ represents an alkoxy group having a carbon atom number of 1-10, $\Delta n$ is larger due to the involvement of an oxygen atom in a conjugated manner.

Said compound represented by formula III preferably comprise one or more of compounds represented by formulas III-1 to III-10

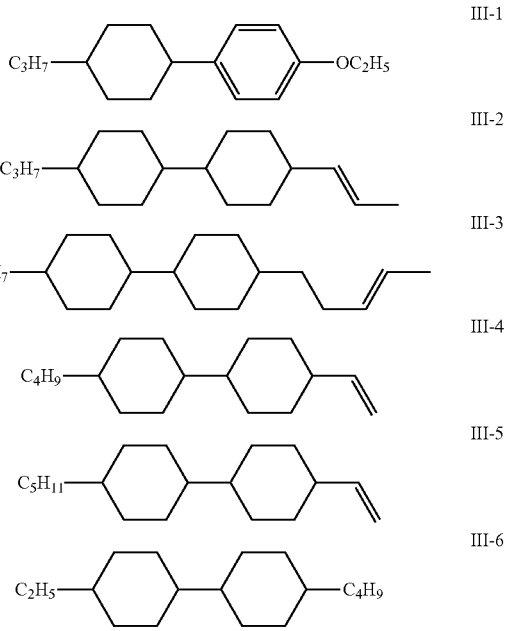

-continued

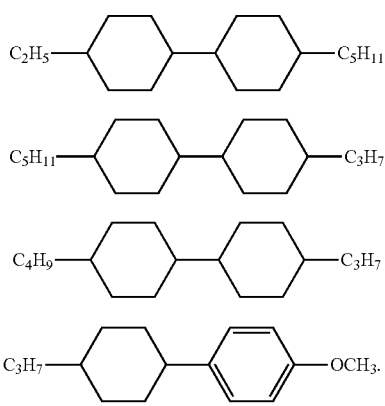

The liquid crystal composition of the present invention may be a positive liquid crystal composition and may further comprise one or more compounds represented by formula IV

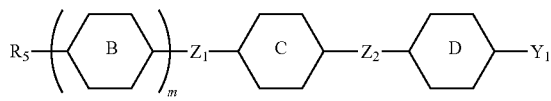

IV wherein
R₅ represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8;
wherein any one or more CH₂ in the group represented by R₅ may be substituted with cyclopentyl, cyclobutyl or cyclopropyl;

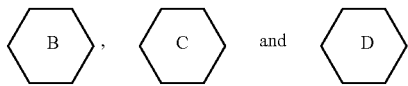

each independently represent
one or two of

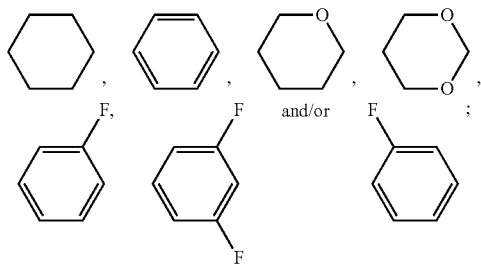

m represents 1 or 2;
Z₁ and Z₂ each independently represent a single bond, —CF₂O—, —CH₂CH₂— or —CH₂O—; and
Y₁ represents F, a fluoro-substituted alkyl group having a carbon atom number of 1-5, a fluoro-substituted alkoxy group having a carbon atom number of 1-5, a fluoro-substituted alkenyl group having a carbon atom number of 2-5, or a fluoro-substituted alkenoxy group having a carbon atom number of 3-8.

Said one or more compounds represented by formula IV are preferably one or more of compounds represented by formulas IV1 to IV22

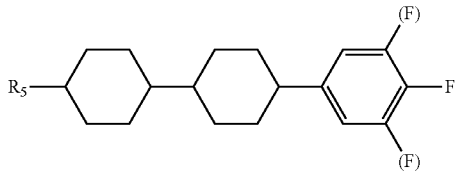

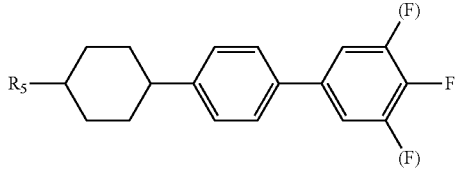

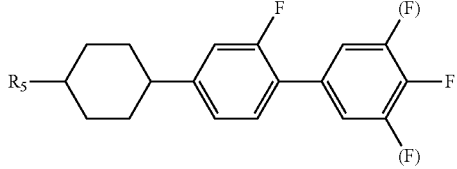

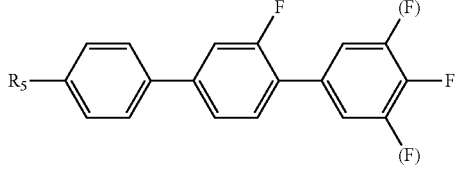

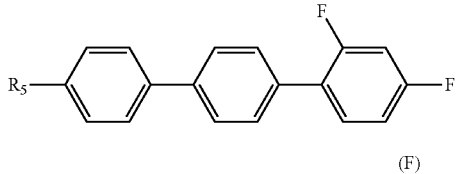

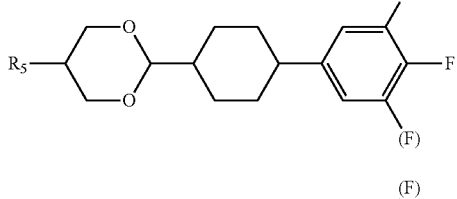

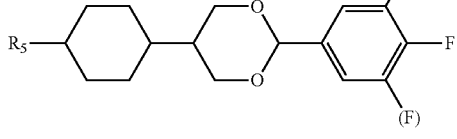

-continued

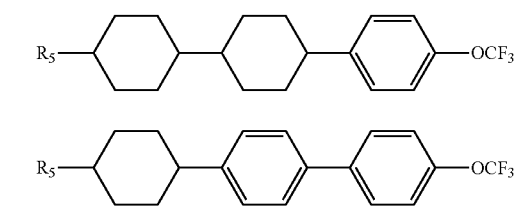

IV8, IV9, IV10, IV11

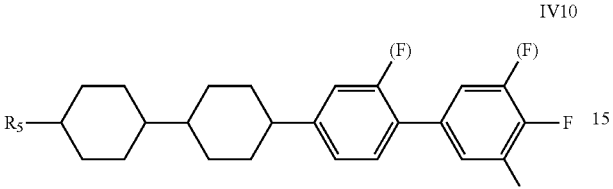

IV12, IV13

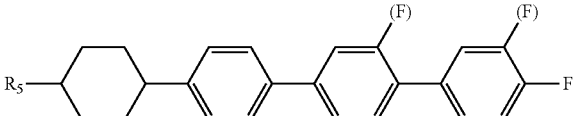

IV14

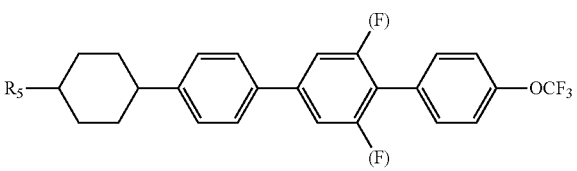

IV15

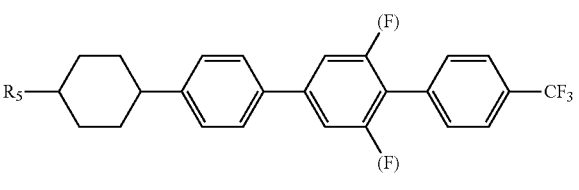

IV16

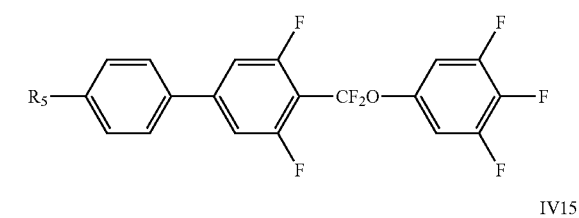

IV17, IV18

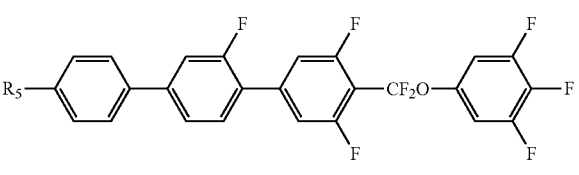

IV19, IV20

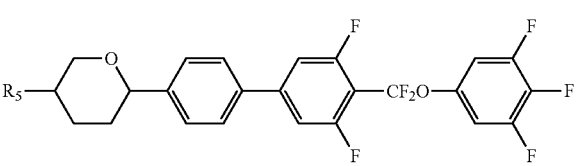

IV21, IV22 wherein one of $X_1$ and $X_2$ represents F and the other represents H;

$R_5$ each independently represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, wherein any $CH_2$ in $R_4$ may be substituted with cyclopentyl, cyclobutyl or cyclopropyl;

$Y_1$ each independently represents F, a fluoro-substituted alkyl group having a carbon atom number of 1-5, a fluoro-substituted alkoxy group having a carbon atom number of 1-5, a fluoro-substituted alkenyl group having a carbon atom number of 2-5, or a fluoro-substituted alkenoxy group having a carbon atom number of 3-8; and (F) each independently represents H or F.

The liquid crystal composition of the present invention may also be a negative liquid crystal composition and may further comprise one or more compounds represented by formula V

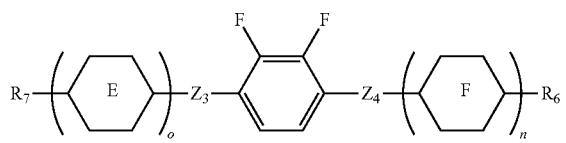

V wherein $R_6$ and $R_7$ each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, wherein any $CH_2$ in the groups represented by $R_6$ and $R_7$ may be substituted with cyclopentyl, cyclobutyl or cyclopropyl;

$Z_3$ and $Z_4$ each independently represent a single bond, —$CH_2CH_2$— or —$CH_2O$—;

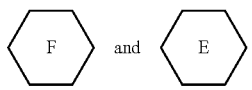

each independently represent one or two of

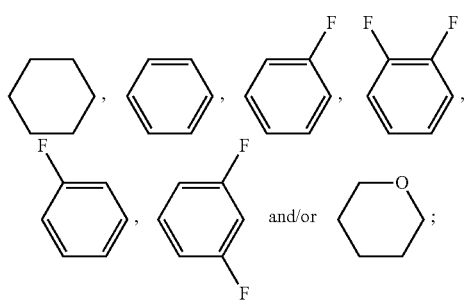

o represents 1 or 2; and
n represents 0, 1 or 2.

Said one or more compounds represented by formula V are preferably one or more of compounds represented by formulas V1 to V11

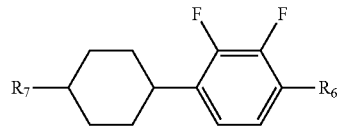

V1

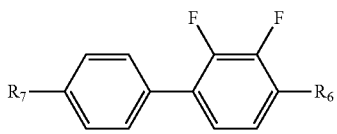

V2

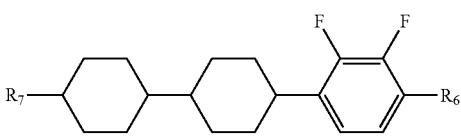

V3

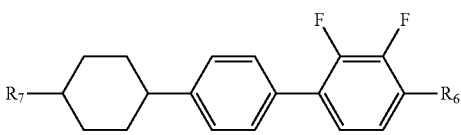

V4

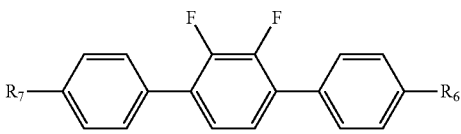

V5

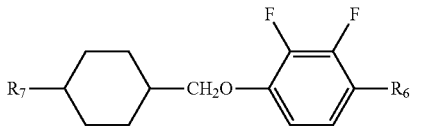

V6

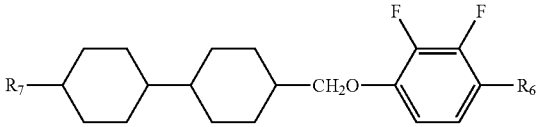

V7

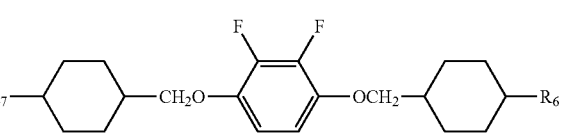

V8

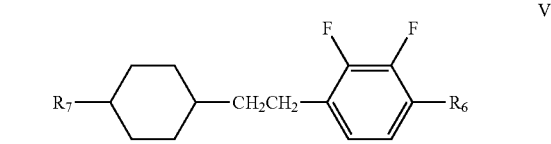

V9

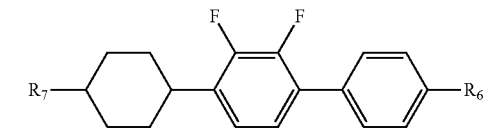

V10

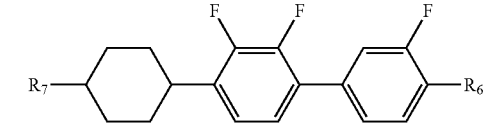

V11

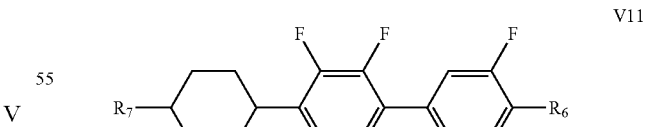

wherein $R_6$ and $R_7$ each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, wherein any $CH_2$ in the groups represented by $R_6$ and $R_7$ may be substituted with cyclopentyl, cyclobutyl or cyclopropyl.

The liquid crystal composition of the present invention may be a negative liquid crystal composition and may further comprise one or more compounds represented by formula VI

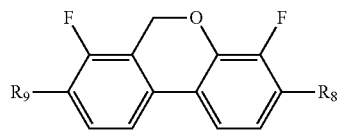

VI wherein $R_8$ and $R_9$ each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, wherein any $CH_2$ in the groups represented by $R_8$ and $R_9$ may be substituted with cyclopentyl, cyclobutyl or cyclopropyl.

The compound represented by formula VI is preferably

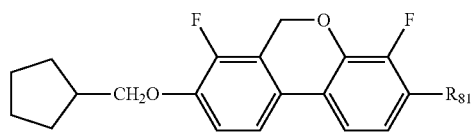

wherein $R_{81}$ represents an alkoxy group having a carbon atom number of 1-10.

The liquid crystal compositions in different ratios of components will exhibit slightly different properties, such as a dielectric anisotropy Δε, an optical anisotropy Δn, a transition temperature point CP when the nematic phase of the liquid crystal transforms into a liquid, stability at low temperatures, which all may be different, and can be used in different types of display devices, but have the same characteristic that the rotary viscosities $γ_1$ thereof are lower. The application to liquid crystal display devices can achieve a fast response.

To the liquid crystal compound of the present invention, various functional dopants may be further added, wherein the contents of the dopants are preferably between 0.01% and 1%, and these dopants are mainly an antioxidant, an ultraviolet absorber and a chiral agent.

The antioxidant and the ultraviolet absorber are preferably:

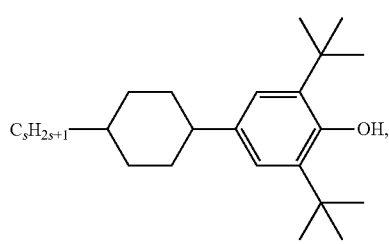

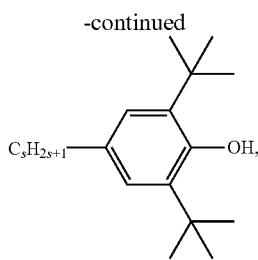

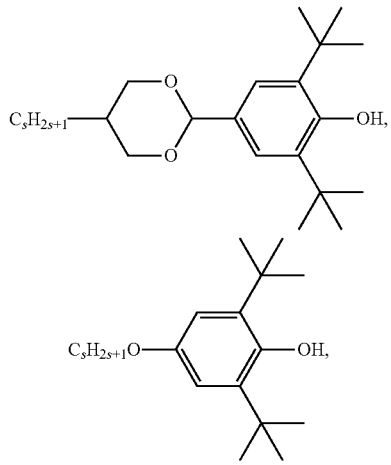

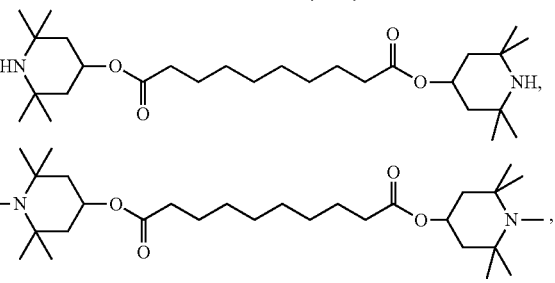

S represents an integer of 1-10.

The chiral agent is preferably (left-hand or right-hand):

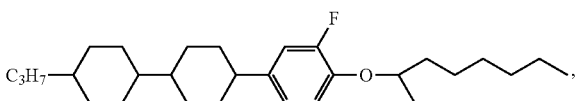

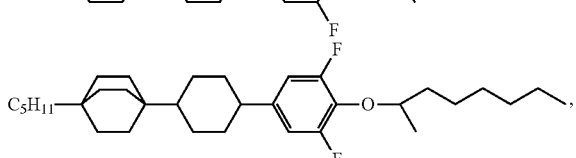

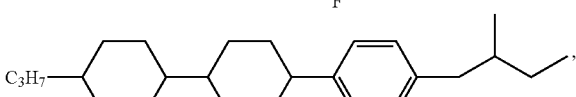

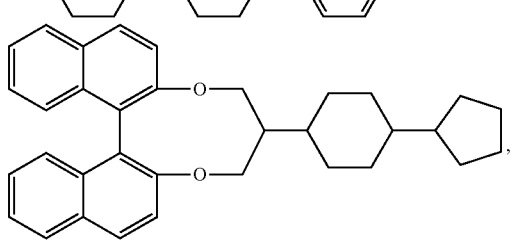

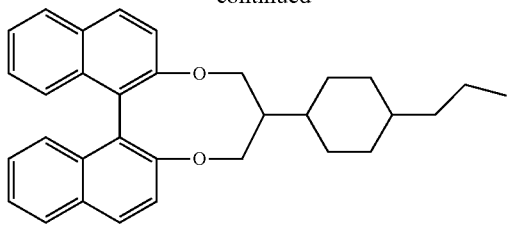

The present invention further relates to a liquid crystal display element or liquid crystal display comprising any liquid crystal composition mentioned above. said display element or display is an active matrix display element or display or a passive matrix display element or display.

Said liquid crystal display element or liquid crystal display is preferably an active matrix addressing liquid crystal display element or liquid crystal display.

Said active matrix display element or display is specifically a TN-TFT or IPS-TFT liquid crystal display element or display.

The liquid crystal composition provided by the present invention has a lower viscosity, can achieve a fast response, and further has a greater optical anisotropy Δn and high stability to heat and light, so the composition is suitable for the development of low-cell thickness fast response liquid crystals.

Liquid crystal materials comprising the liquid crystal composition provided by the present invention not only have good chemical and thermal stability, but also have stability to electric fields and electromagnetic radiations. Furthermore, as liquid crystal materials for thin film transistor techniques (TFT-LCD), they further have a broader nematic phase temperature range, a suitable birefringence anisotropy, a very high electrical resistivity, a good anti-ultraviolet property, a high charge holding ratio, a low vapour pressure and other properties.

DETAILED DESCRIPTION OF EMBODIMENTS

The present invention is further described in conjunction with particular examples below, but the present invention is not limited to the following examples. Said methods are all conventional methods, unless otherwise specified. Said raw materials can all be obtained from disclosed commercial approaches unless otherwise specified. Said percentages are all mass percentages unless otherwise specified.

In the following examples,

CP represents a clearing point, directly determined by WRX-1S microscopic thermal analyzer, with a temperature rate set to be 3° C./min.

Δn represents an optical anisotropy (589 nm, 25° C.),

Δε represents a dielectric anisotropy (25° C., 1 KHz, HP4284A, and a 5.2 μm TN left-hand cell), $\gamma_1$ represents a rotary viscosity (mPa·s) at 25° C., VHR (%) represents a charge holding ratio (5V, 60 Hz, 20° C.), and ρ ($\times 10^{13}$ Ω·cm) represents an electrical resistivity (at 20° C.)

Instruments for measuring voltage holding ratio VHR (%) and electrical resistivity ρ ($\times 10^{13}$ Ω·cm) are both TOYO06254 and TOYO6517 model liquid crystal physical property evaluation systems (test temperature: 20° C., time: 16 ms, and test cell 7.0 μm)

In the examples of the present invention application, liquid crystal monomer structures are represented by codes, wherein the code representation of ring structures, end groups and linking groups of the liquid crystals are shown in tables (I) and (II) below

TABLE (I)

Corresponding code for ring structure

| Ring structure | Corresponding code |
|---|---|
| (cyclohexane) | C |
| (phenyl) | P |
| (mono-F phenyl) | G |
| (di-F phenyl) | U |
| (mono-F phenyl, other position) | GI |
| (di-F phenyl, other positions) | Y |
| (tetrahydropyran) | A |
| (dioxane) | D |
| (difluoro chromene-type) | BHHO- -FF |
| (difluoro dibenzofuran) | B |
| (difluoro dibenzothiophene) | B(S) |

TABLE (II)

| Corresponding code for end group and linking group | |
|---|---|
| End group and linking group | Corresponding code |
| $C_nH_{2n+1}-$ | n- |
| $C_nH_{2n+1}O-$ | nO- |
| $-OCF_3$ | OT |
| $-CF_3$ | -T |
| $-CF_2O-$ | Q |
| $-F$ | $-F$ |
| $-CN$ | $-CN$ |
| $-CH_2CH_2-$ | -E- |
| $-CH=CH-$ | -V- |
| $-C\equiv C-$ | -W- |
| $-COO-$ | $-COO-$ |
| $-CH=CH-C_nH_{2n+1}$ | Vn- |
| 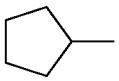 | C(5)- |
| 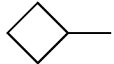 | C(4)- |
|  | C(3)- |

EXAMPLE

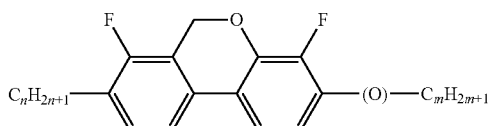

BHHO-n-(O)mFF

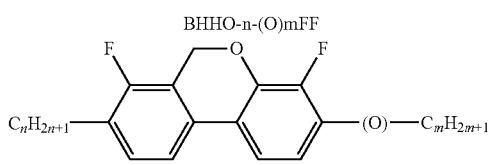

BHHO-n-(O)mFF

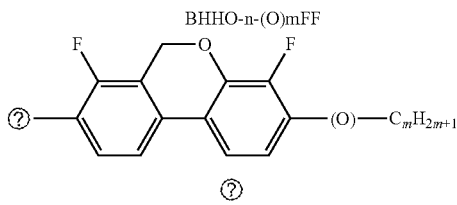

Example 1

| Category | Liquid crystal monomer code | Content (%) |
|---|---|---|
| IV | PPGU-Cpr1-F | 2.0 |
| III | CC-3-V | 50.0 |
| IV | PGUQU-3-F | 3.5 |
| IV | PPGI-3-F | 5 |
| IV | PPGU-Cp-F | 1.5 |
| I | CPP-3-2V1 | 2.0 |
| III | PP-5-1 | 11.5 |
| IV | PTP-1-O2 | 5.0 |
| III | CP-3-O2 | 0.5 |
| IV | CCP-V-1 | 0.5 |
| IV | CPUP-3-OCF3 | 5.0 |
| II | CPP-1V-2 | 2.0 |
| IV | CPTP-3-2 | 5.0 |
| III | CC-3-V1 | 6.0 |
| IV | PGPC-2-5 | 0.5 |

Δε [1 KHz, 25° C.]: 2.4

Δn [589 nm, 25° C.]: 0.120

Cp: 85° C.

γ₁: 48 mPa · s.

Comparative Example 1

| Category | Liquid crystal monomer code | Content (%) |
|---|---|---|
| IV | PPGU-Cpr1-F | 2.0 |
| III | CC-3-V | 50.0 |
| IV | PGUQU-3-F | 3.5 |
| IV | PPGI-3-F | 5 |
| IV | PPGU-Cp-F | 1.5 |
| | CPP-3-2 | 2.0 |
| III | PP-5-1 | 11.5 |
| IV | PTP-1-O2 | 5.0 |
| III | CP-3-O2 | 0.5 |
| IV | CCP-V-1 | 0.5 |
| IV | CPUP-3-OCF3 | 5.0 |
| | CPP-3-2 | 2.0 |
| IV | CPTP-3-2 | 5.0 |
| III | CC-3-V1 | 6.0 |
| IV | PGPC-2-5 | 0.5 |

Δε [1 KHz, 25° C.]: 2.4

Δn [589 nm, 25° C.]: 0.119

Cp: 77° C.

γ₁: 49 mPa · s.

The Cp of the comparative example is significantly reduced.

Example 2

| Category | Liquid crystal monomer code | Content (%) |
|---|---|---|
| III | CC-3-V | 52.5 |
| III | CC-3-V1 | 2.0 |
| III | PP-5-1 | 6.0 |
| I | CPP-3-2V1 | 8.0 |
| IV | PGUQU-3-F | 3.5 |
| V | PYP-23 | 2.5 |
| IV | PPGI-3-F | 4.0 |
| IV | PPGI-5-F | 4.0 |
| IV | CPU-3-F | 5.5 |
| IV | PGP-Cpr1-1 | 6.0 |
| IV | PPGU-Cp-F | 2.0 |
| IV | PPGU-Cpr-F | 2.5 |
| IV | CPUP-3-OCF3 | 1.5 |

Δε [1 KHz, 25° C.]: 2.6

Δn [589 nm, 25° C.]: 0.122

Cp: 85° C.

γ₁: 47 mPa · s.

Comparative Example 2

| Category | Liquid crystal monomer code | Content (%) |
|---|---|---|
| III | CC-3-V | 52.5 |
| III | CC-3-V1 | 2.0 |
| III | PP-5-1 | 6.0 |
|  | CPP-3-2 | 8.0 |
| IV | PGUQU-3-F | 3.5 |
| V | PYP-23 | 2.5 |
| IV | PPGI-3-F | 4.0 |
| IV | PPGI-5-F | 4.0 |
| IV | CPU-3-F | 5.5 |
| IV | PGP-Cpr1-1 | 6.0 |
| IV | PPGU-Cp-F | 2.0 |
| IV | PPGU-Cpr-F | 2.5 |
| IV | CPUP-3-OCF3 | 1.5 |

Δε [1 KHz, 25° C.]: 2.6
Δn [589 nm, 25° C.]: 0.120
Cp: 77° C.
$\gamma_1$: 47 mPa · s.

The Cp of the comparative example is significantly reduced.

Example 3

| Category | Liquid crystal monomer code | Content (%) |
|---|---|---|
| III | CCH-53 | 4.0 |
| III | PP-51 | 2.5 |
| III | CC-3-V | 46.0 |
| V | CCY-3-O2 | 10.0 |
| V | CCY-5-O2 | 7.0 |
| IV | PUQU-Cp-F | 15.5 |
| IV | PPGU-Cp-F | 2.0 |
| II | CPP-1V-2 | 3.0 |
| I | CPP-3-2V1 | 10.0 |

Δε [1 KHz, 25° C.]: 3.0
Δn [589 nm, 25° C.]: 0.097
Cp: 80° C.
$\gamma_1$: 73 mPa · s.

Example 4

| Category | Liquid crystal monomer code | Content (%) |
|---|---|---|
| III | CCH-53 | 4.00 |
| III | PP-51 | 2.50 |
| III | CC-3-V | 46.00 |
| V | CCY-3-O2 | 10.00 |
| V | CCY-5-O2 | 7.00 |
| IV | PUQU-Cp-F | 15.50 |
| IV | PPGU-Cp-F | 2.00 |
| I | CPP-1V-2 | 3.00 |
| I | CPP-3-2V1 | 10.00 |

Δε [1 KHz, 25° C.]: 3.0
Δn [589 nm, 25° C.]: 0.094
Cp: 76° C.
$\gamma_1$: 68 mPa · s.

Example 5

| Category | Liquid crystal monomer code | Content (%) |
|---|---|---|
| III | CCH-53 | 3.0 |
| III | PP-51 | 6.0 |
| III | CC-3-V | 53.0 |
| III | CC-3-V1 | 10.0 |
| IV | PGUQU-Cp-F | 6.0 |
| IV | APUQU-Cp-F | 4.0 |
| IV | PPGU-Cp-F | 2.0 |
| IV | PGP-Cpr1-1 | 6.0 |
| I | CPP-3-2V1 | 10.0 |

Δε [1 KHz 25° C.]: 2.7
Δn [589 nm, 25° C.]: 0.099
Cp: 82° C.
$\gamma_1$: 49 mPa · s.

Example 6

| Category | Liquid crystal monomer code | Content (%) |
|---|---|---|
| IV | CPP-3-2 | 9.0 |
| IV | CPP-3-O1 | 3.0 |
| V | CCOY-3-O2 | 15.0 |
| III | CC-3-V | 26.0 |
| V | CY-3-O4 | 29.97 |
| I | CPP-3-2V1 | 10.0 |
| V | PYP-Cpr1-2 | 7.0 |
|  |  | 0.03 |

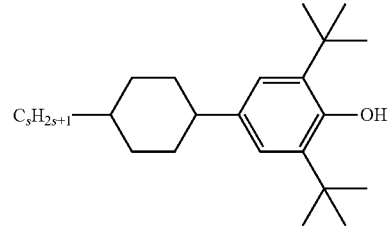

Δε [1 KHz, 25° C.]: −2.8
Δn [589 nm, 25° C.]: 0.103
Cp: 75° C.
$\gamma_1$: 84 mPa.s.

Example 7

| Category | Liquid crystal monomer code | Content (%) |
|---|---|---|
| III | CC-3-V | 19 |
| V | CY-3-O2 | 18 |
| V | CY-5-O2 | 13.5 |
| V | CCY-3-O2 | 11 |
| V | CCY-2-O2 | 5 |
| V | PYP-23 | 7 |
| III | CC-2-3 | 8.5 |
| II | CPP-1V-2 | 8.5 |
| I | CPP-3-2V1 | 9.5 |

Δε [1 KHz, 25° C.]: −3.0
Δn [589 nm, 25° C.]: 0.103
Cp: 76° C.
$\gamma_1$: 80 mPa · s.

Example 8

| Category | Liquid crystal monomer code | Content (%) |
| --- | --- | --- |
| IV | CPP-3-2 | 4.0 |
| III | PP-5-O2 | 4.5 |
| V | CCOY-3-O2 | 15.0 |
| III | CC-3-V | 28.5 |
| V | CCOY-2-O2 | 10.0 |
| V | COY-Cp-O2 | 5.5 |
| V | PY-3-O2 | 13.0 |
| V | CCOY-4-O2 | 10.0 |
| II | CPP-1V-2 | 5.0 |
| I | CPP-3-2V1 | 4.5 |

Δε [1 KHz, 25° C.]: −4.1
Δn [589 nm, 25° C.]: 0.107
Cp: 88° C.
$\gamma_1$: 115 mPa · s.

Example 9

| Category | Liquid crystal monomer code | Content (%) |
| --- | --- | --- |
| IV | CPP-3-2 | 9 |
| V | CPY-3-O2 | 11 |
| V | CY-3-O2 | 18 |
| III | CC-4-3 | 6 |
| V | CCY-2-O2 | 6 |
| V | CPY-2-O2 | 10 |
| V | CY-3-O4 | 10 |
| III | CC-2-3 | 22 |
| I | CPP-3-2V1 | 8 |

Δε [1 KHz, 25° C.]: −3.0
Δn [589 nm, 25° C.]: 0.103
Cp: 75° C.
$\gamma_1$: 84 mPa · s.

Example 10

| Category | Liquid crystal monomer code | Content (%) |
| --- | --- | --- |
| IV | CPP-3-2 | 8 |
| V | CCOY-3-O2 | 10 |
| III | CC-3-V | 25 |
| III | CP-3-O2 | 6.5 |
| V | CCY-3-O2 | 4 |
| V | CCOY-2-O2 | 10 |
| V | COY-Cp-O2 | 7 |
| V | PY-3-O2 | 9 |
| V | CPY-3-O2 | 9 |
| I | CPP-3-2V1 | 7.5 |
| II | CPP-1V-2 | 4 |

Δε [1 KHz, 25° C.]: −3.5
Δn [589 nm, 25° C.]: 0.11
Cp: 90° C.
$\gamma_1$: 108 mPa · s.

It can be seen from the above examples that the liquid crystal composition of the present invention has a higher Cp, and can achieve a wider service temperature range when being used for liquid crystal display. It is especially suitable for vehicle-mounted liquid crystal materials for TN, IPS, FFS and VA modes with a wide temperature service range, etc.

The invention claimed is:

1. A liquid crystal composition, wherein said liquid crystal composition comprises one or more compounds represented by formula I and one or more compounds represented by formula III:

wherein
- $R_1$ and $R_4$ each independently represent an alkyl group having a carbon atom number of 1-5 or an alkenyl group having a carbon atom number of 2-5;
- $R_3$ represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8;
- wherein any one or more non-connected $CH_2$ in groups represented by $R_1$, $R_3$ and $R_4$ may be substituted with cyclopentyl, cyclobutyl, cyclopropyl or —O—; and A and G each independently represent 1,4-phenylene, 1,4-cyclohexylene or 1,4-cyclohexenylene.

2. The liquid crystal composition according to claim 1, wherein said one or more compounds represented by formula III are one or more of compounds represented by formulas III-1 to III-12, -continued

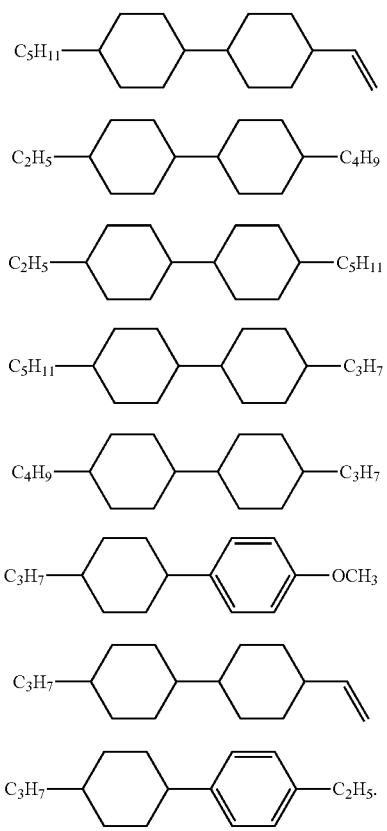

3. The liquid crystal composition according to claim 1, wherein in said liquid crystal composition, a total mass content of said one or more compounds represented by formula I is 1-20%, and a total mass content of said one or more compounds represented by formula III is 5-85%.

4. The liquid crystal composition according to claim 1, wherein said liquid crystal composition is a positive liquid crystal composition, and further comprises one or more compounds represented by formula IV,

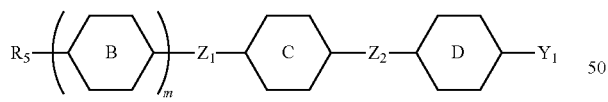

IV wherein
R$_5$ represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8;
wherein any one or more CH$_2$ in the group represented by R$_5$ may be substituted with cyclopentyl, cyclobutyl or cropopyl;

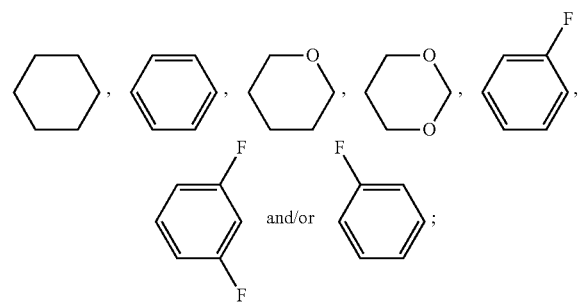

each independently represent one or two of m represents 1 or 2;
Z$_1$ and Z$_2$ each independently represent a single bond, —CF$_2$O—, —CH$_2$CH$_2$— or —CH$_2$O—; and
Y$_1$ represents F, a fluoro-substituted alkyl group having a carbon atom number of 1-5, a fluoro-substituted alkoxy group having a carbon atom number of 1-5, a fluoro-substituted alkenyl group having a carbon atom number of 2-5, or a fluoro-substituted alkenoxy group having a carbon atom number of 3-8.

5. The liquid crystal composition according to claim 4, wherein said one or more compounds represented by formula IV are one or more of compounds represented by formulas IV1 to IV22,

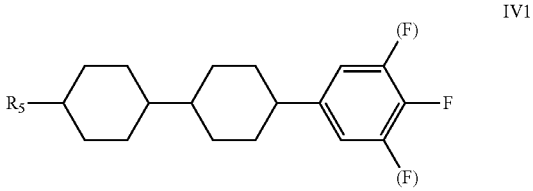

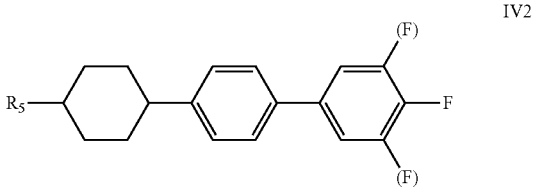

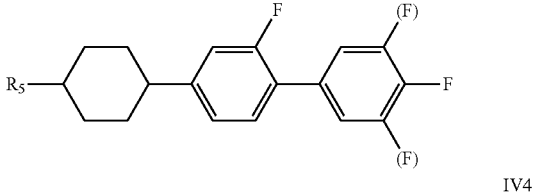

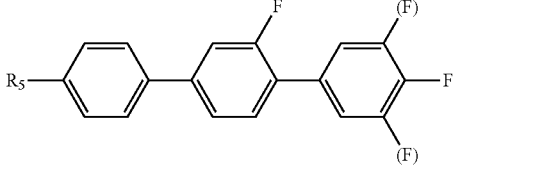

-continued wherein one of $X_1$ and $X_2$ represents F and the other represents H;

$R_5$ each independently represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, wherein any $CH_2$ in $R_4$ may be substituted with cyclopentyl, cyclobutyl or cyclopropyl;

$Y_1$ each independently represents F, a fluoro-substituted alkyl group having a carbon atom number of 1-5, a fluoro-substituted alkoxy group having a carbon atom number of 1-5, a fluoro-substituted alkenyl group having a carbon atom number of 2-5, or a fluoro-substituted alkenoxy group having a carbon atom number of 3-8; and (F) each independently represents H or F.

6. The liquid crystal composition according to claim 1, wherein said liquid crystal composition is a negative liquid crystal composition, and further comprises one or more compounds represented by formula V

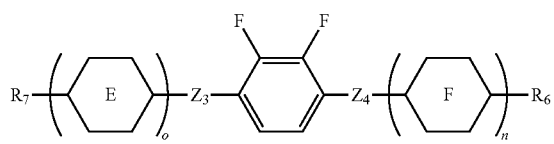
V wherein $R_6$ and $R_7$ each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, wherein any $CH_2$ in the groups represented by $R_6$ and $R_7$ may be substituted with cyclopentyl, cyclobutyl or cyclopropyl;

$Z_3$ and $Z_4$ each independently represent a single bond, —$CH_2CH_2$— or —$CH_2O$—;

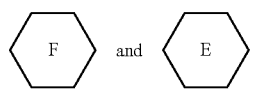

each independently represent one or two of

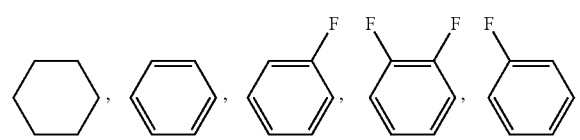

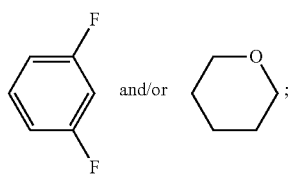

o represents 1 or 2; and n represents 0, 1 or 2.

7. The liquid crystal composition according to claim 6, wherein said one or more compounds represented by formula V are one or more of compounds represented by formulas V1 to V11,

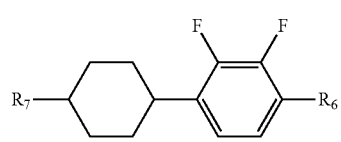
V1

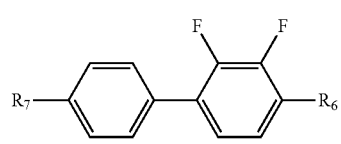
V2

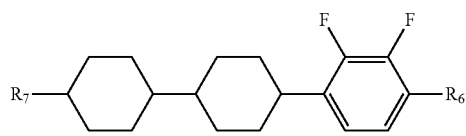
V3

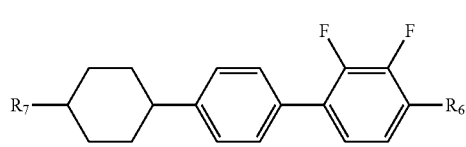
V4

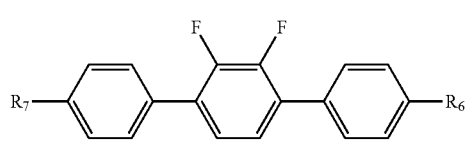
V5

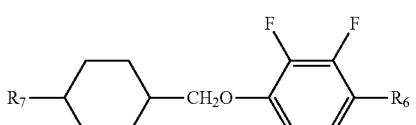
V6

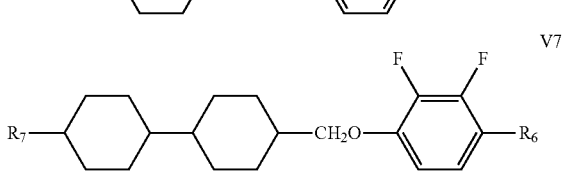
V7

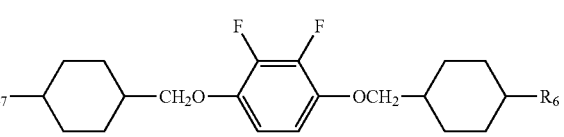
V8

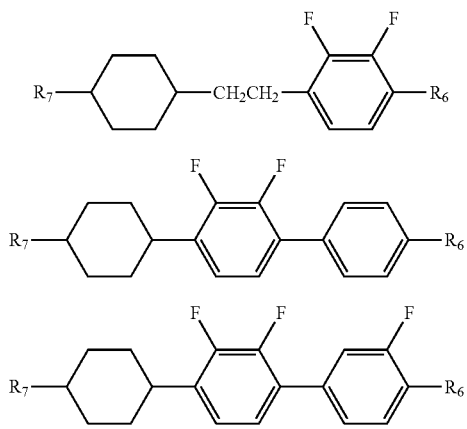

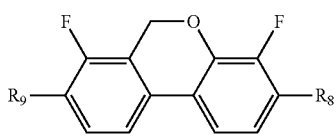

wherein $R_6$ and $R_7$ each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, wherein any $CH_2$ in the groups represented by $R_6$ and $R_7$ may be substituted with cyclopentyl, cyclobutyl or cyclopropyl.

8. The liquid crystal composition according to claim 1, wherein said liquid crystal composition is a negative liquid crystal composition, and further comprises one or more compounds represented by formula VI, wherein $R_8$ and $R_9$ each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, wherein any $CH_2$ in the groups represented by $R_8$ and $R_9$ may be substituted with cyclopentyl, cyclobutyl or cyclopropyl.

9. A liquid crystal display element or liquid crystal display comprising the liquid crystal composition of claim 1, wherein said display element or display is an active matrix display element or display or a passive matrix display element or display.

10. The liquid crystal display element or liquid crystal display according to claim 9, wherein said active matrix display element or display is a TN-TFT or IPS-TFT or VA-TFT liquid crystal display element or display.

* * * * *